Dec. 30, 1924.  
E. F. TINKER  
AMUSEMENT DEVICE  
Filed Jan. 31, 1922
1,521,133
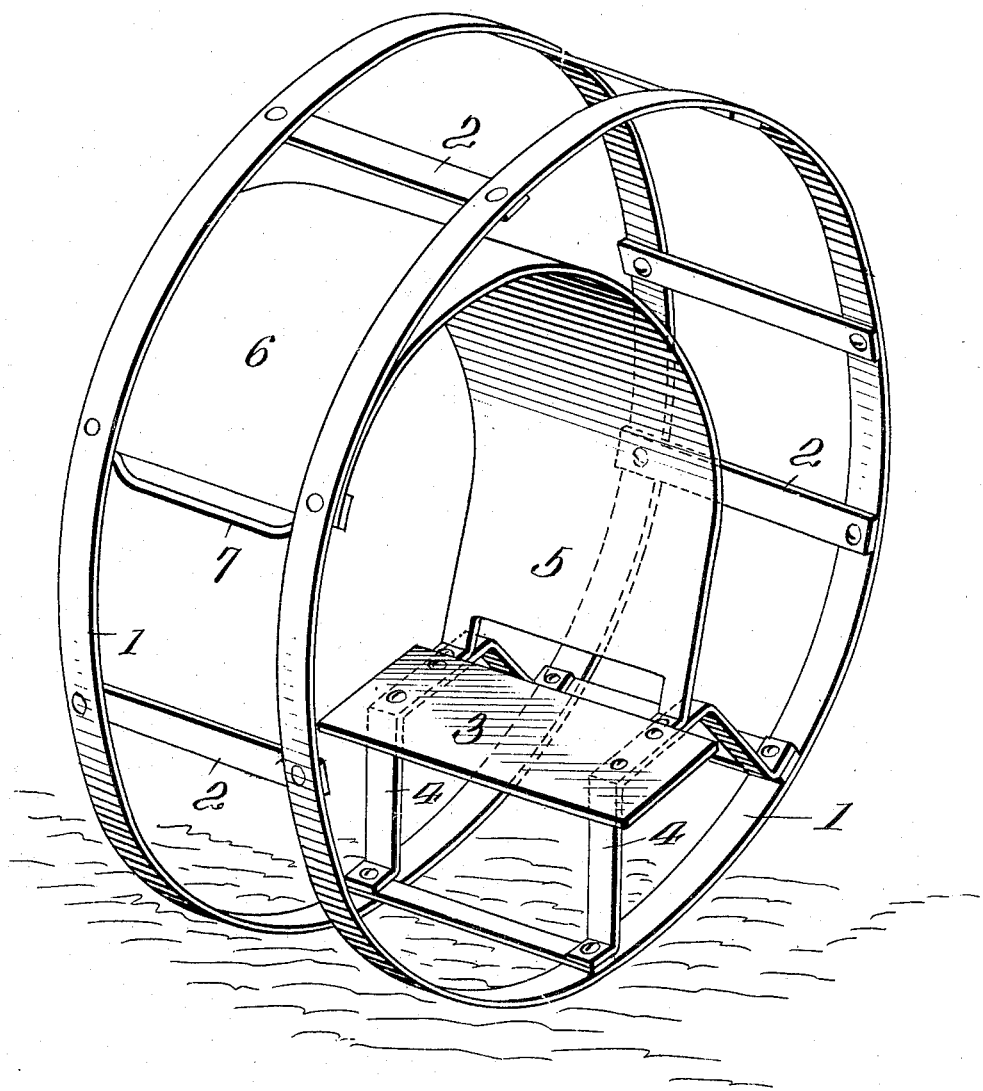
Inventor  
E. F. Tinker Patented Dec. 30, 1924.

1,521,133

UNITED STATES PATENT OFFICE.

EUGENE F. TINKER, OF SALINA, KANSAS.

AMUSEMENT DEVICE.

Application filed January 31, 1922. Serial No. 533,099.

*To all whom it may concern:*

Be it known that I, EUGENE F. TINKER, of Salina, in the county of Saline and State of Kansas, have invented certain new and useful Improvements in Amusement Devices; and I do hereby declare the following to be a full, clear, and exact description of the invention, such as will enable others skilled in the art to which it appertains to make and use the same.

My invention relates to amusement devices and especially to such as are primarily adapted for use by children, my improvement in the art being a simple tumbling device having a means for supporting the user therein in a fixed position so that as the device is rotated through its own momentum the youngster will be turned in somersault fashion.

In the drawings, the figure is a view in perspective of my improved tumbling device.

In the form shown in the drawings, and which is a preferred construction, my improved tumbling device includes a pair of rings 1 of metal of sufficient stiffness to reasonably maintain the ring-like shape, these rings being preferably spaced by cross pieces 2 riveted or otherwise secured thereto, such cross pieces being fastened to the inner faces of the rings so as to not interfere with smooth rolling of the device. The parts described constitute a frame within which a seat 3 for the user is supported by appropriately bent strap irons 4 which are rigidly secured to the rings, a back rest 5 rising from the rear of the seat and extending therefrom in a curved direction into engagement with the rings 1 being secured to these rings and extending along the inner faces thereof for a short distance to form a shield 6 for the head of the user. In juxtaposition to the terminus of this shield is a hand hold 7.

The device is preferably started on a slight incline so as to give it sufficient momentum to continue tumbling on down a hill with the youngster firmly seated therein, with the feet resting on the rings and a firm grip had on the hand hold.

I claim as my invention:

1. A rolling vehicle including a rolling member, a seat mounted therein, and a shield disposed between an occupant of said seat and the periphery of said member for protecting said occupant in the rolling of the vehicle.

2. A rolling vehicle including a cylindrical rolling member, a seat fixed within said cylindrical member, and a curved protecting shield within the member for the occupant of the seat.

3. A rolling vehicle including a pair of annular ring members, means for holding said members in spaced relation, and means for carrying and protecting a passenger within said vehicle during the rolling thereof, the periphery of said rings forming the rolling surface for the vehicle.

4. A rolling vehicle including a frame, a seat fixedly secured thereto, and a back rest and head shield secured to said frame.

5. A rolling vehicle comprising a ring-like member, a seat in fixed engagement with said member, a back rest and head shield extending from said seat and terminating in engagement with said ring-like member, and a hand hold adjacent said terminus of the head shield.

6. A rolling vehicle comprising a pair of spaced apart rings, a seat supported by said rings and in fixed engagement therewith, a back rest in cooperation with said seat, a head shield secured to said rings, and a hand hold adjacent said head shield.

In testimony whereof I have signed this specification.

EUGENE F. TINKER.